United States Patent
Sakai et al.

(10) Patent No.: US 6,971,379 B2
(45) Date of Patent: Dec. 6, 2005

(54) COMBUSTION CHAMBER STRUCTURE IN AN INTERNAL COMBUSTION ENGINE

(75) Inventors: Tomoharu Sakai, Okazaki (JP); Takeshi Hasegawa, Kyoto (JP); Takafumi Shigemori, Aichi (JP); Toshiaki Umemura, Nisshin (JP); Yoshiyuki Hoshiba, Kyoto (JP); Katsuhiko Miyamoto, Kyoto (JP); Kiyotaka Hosono, Kyoto (JP); Hideki Miyamoto, Seto (JP); Yu Yokoyama, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/968,919

(22) Filed: Oct. 21, 2004

(65) Prior Publication Data

US 2005/0109328 A1 May 26, 2005

(30) Foreign Application Priority Data

Oct. 24, 2003 (JP) .............................. 2003-365036
Apr. 28, 2004 (JP) .............................. 2004-133887

(51) Int. Cl.$^7$ ............................................. F02B 23/00
(52) U.S. Cl. ...................................... 123/661; 123/671
(58) Field of Search ................................. 123/661, 664, 123/671

(56) References Cited

FOREIGN PATENT DOCUMENTS

JP          2001-59422 A          3/2001

Primary Examiner—Noah P. Kamen
(74) Attorney, Agent, or Firm—Birch, Stewart, Kolasch & Birch, LLP

(57) ABSTRACT

There is provided a combustion chamber structure in an internal combustion engine in which, at a peripheral portion of a combustion chamber, a gap between a cylinder head lower face and a piston upper face is small in intake-to-intake and exhaust-to-exhaust zones and gradually increases toward an intake-to-exhaust zone. According to such design, the mixture in the peripheral portion of the combustion chamber can smoothly flow from the intake-to-intake and exhaust-to-exhaust zones to the intake-to-exhaust zone along the peripheral face of the cylinder. The flow of air-fuel mixture from the intake-to-intake zone collides at the center of the intake-to-exhaust zone with the flow of mixture from the exhaust-to-exhaust zone, and the combined flow goes over a conical tapered portion in the upper face of the piston and vigorously enters a central recessed portion thereof. Therefore, it is possible to satisfactorily mix an air-fuel mixture with a simplified configuration.

8 Claims, 10 Drawing Sheets

COMBUSTION CHAMBER STRUCTURE IN AN INTERNAL COMBUSTION ENGINE

CROSS-REFERENCE TO RELATED APPLICATIONS

This Nonprovisional application claims priority under 35 U.S.C. §119(a) on Patent Application Nos. 2003-365036 and 2004-133887 filed in Japan on Oct. 24, 2003 and Apr. 28, 2004, respectively, the entire contents of which are hereby incorporated by reference.

BACKGROUND OF THE INVENTION

1. Field of the Invention

This invention relates to a combustion chamber structure in an internal combustion engine, and more particularly, to a technical art to encourage an air-fuel mixture to flow in a combustion chamber.

2. Description of the Related Art

It is known that, if an air-fuel mixture in a combustion chamber of an internal combustion engine is mixed enough to produce a turbulent flow at the time of ignition, the combustion velocity generally increases, and the combustion efficiency is thereby improved. In this respect, there is proposed a technical art comprising lower and upper protrusions that are formed at a peripheral edge of an upper face of a piston and a peripheral edge of a lower face of a cylinder head, respectively. At the end of the compression stroke, the lower protrusion is brought close to the upper protrusion as the piston is lifted, whereby a narrow gap, i.e., a so-called squish area, is formed. The mixture pushed out from the squish area serves as squish, so that the mixture is mixed in the combustion chamber (refer to Japanese unexamined patent publication no. 2001-59422, for instance).

From the point of view for mixing the mixture, ideally, the squish area is formed uniformly over the entire circumference of the combustion chamber. However, the provision of the squish area over the entire circumference to attain a stable performance entails a problem that a strict management of size tolerances of the cylinder head and the piston must be made.

When an attempt is made to provide the squish area over the entire circumference, shrouds must be provided in the cylinder head around intake and exhaust valves, posing a problem that it becomes difficult to ensure a sufficient amount of intake air.

As disclosed in Japanese unexamined patent publication no. 2001-59422, the piston is generally often provided at its upper face with valve recesses to avoid interference between the piston and the intake and exhaust valves. In order to provide such valve recesses, however, the squish area must be partly removed. This makes it more difficult to provide the squish area over the entire circumference.

SUMMARY OF THE INVENTION

The object of the present invention is to provide a combustion chamber structure in an internal combustion engine that is simple in construction but is capable of satisfactorily mixing an air-fuel mixture, thereby improving the combustion efficiency.

According to this invention, there is provided a combustion chamber structure in an internal combustion engine having a combustion chamber that is vertically defined by a lower face of a cylinder head and an upper face of a piston fitted in a cylinder, the lower face of the cylinder head being substantially circular in plain shape. The combustion chamber structure comprises at least one intake valve provided on one side of the cylinder head with respect to a predetermined chord having both ends thereof crossing a curve that defines the plain shape of the lower face of the cylinder head; at least one exhaust valve provided on another side of the cylinder head with respect to the predetermined chord; a tapered portion formed substantially conical in shape at a peripheral portion of the upper face of the piston; and a recessed portion formed at near the center of the upper face of the piston, wherein a gap between said tapered portion of the upper face of the piston and a peripheral portion of the lower face of the cylinder head opposed thereto is formed to increase toward vicinity of the chord.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

With reference to FIGS. 1–5, a combustion chamber structure in an internal combustion engine according to a first embodiment of this invention will be described below.

Figure 1:
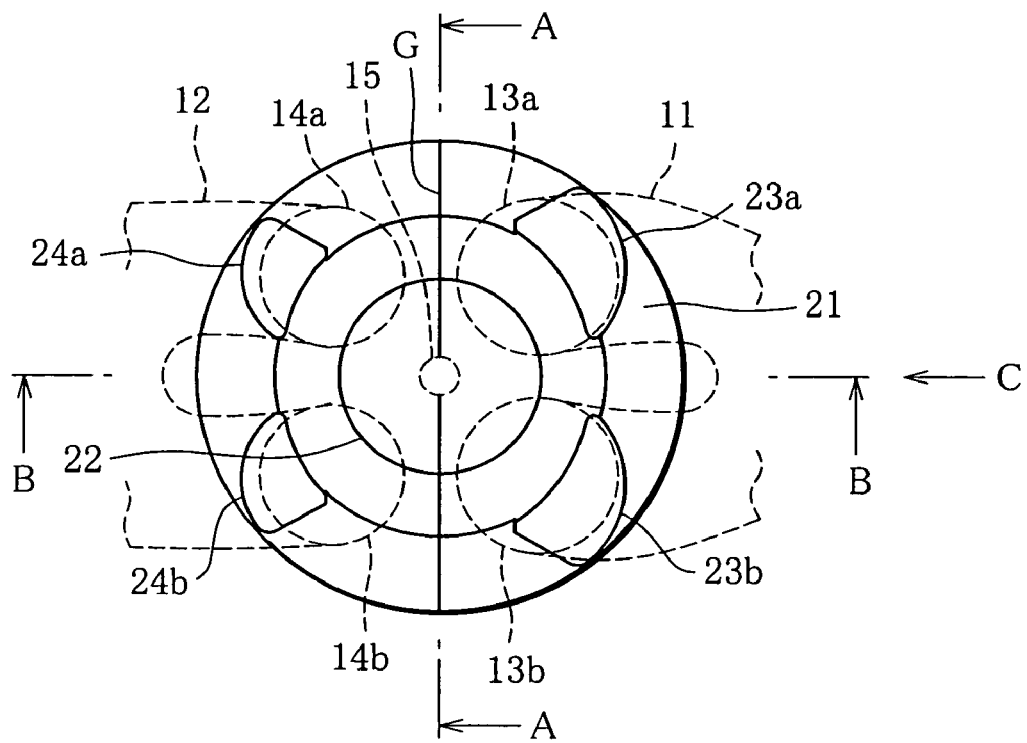
FIG. 1 is a plan view of a combustion chamber structure in an internal combustion engine according to a first embodiment of this invention, as seen from a cylinder head.
Figure 2:
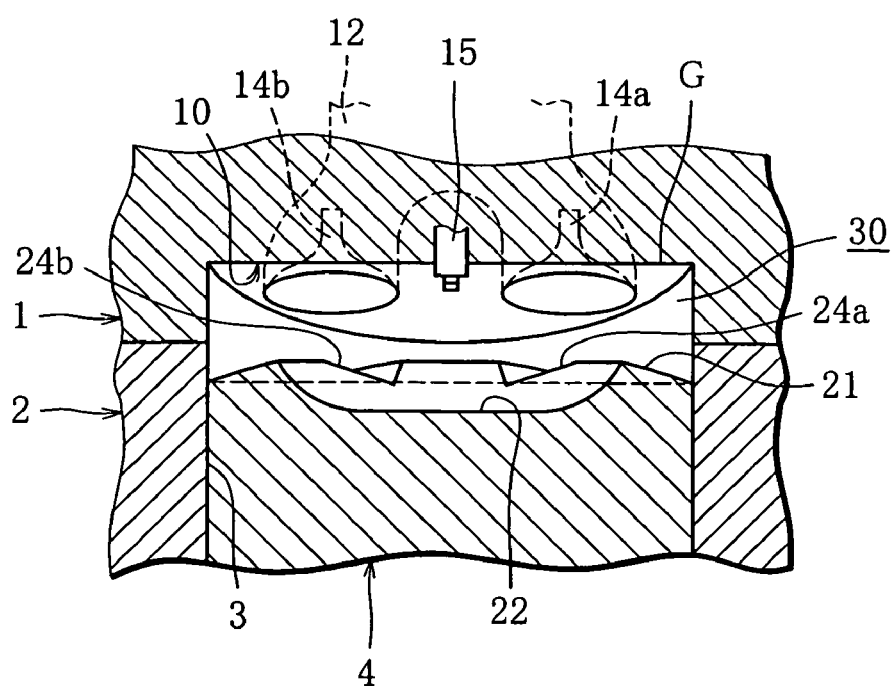
FIG. 2 is a sectional view taken along the line A—A of FIG. 1.
Figure 3:
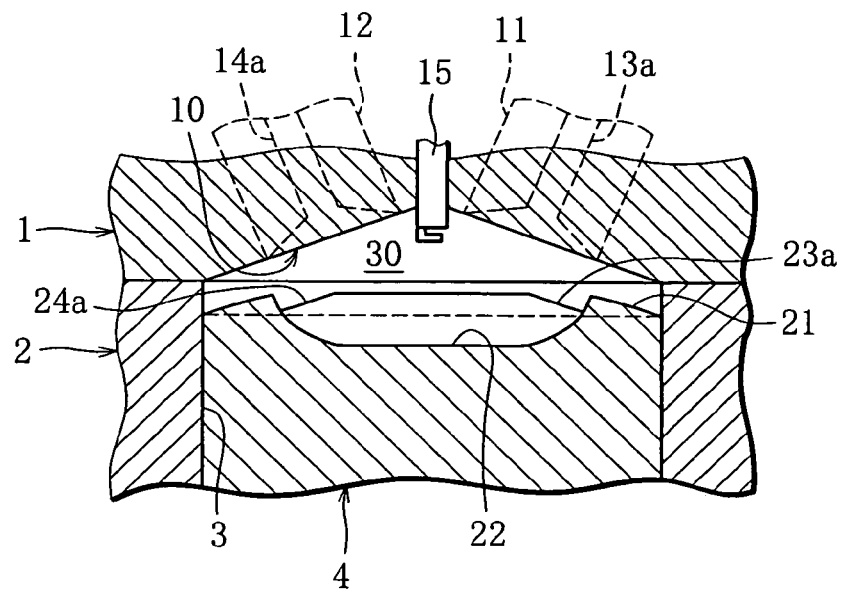
FIG. 3 is a sectional view taken along the line B—B of FIG. 1.

As shown in FIGS. 1–3, the combustion chamber structure of this embodiment is adapted for use in a four-valve gasoline engine, in which a cylinder head 1 is placed on a cylinder block 2 formed with a cylindrical cylinder 3 in which a piston 4 is fitted for a vertical sliding motion. A combustion chamber 30 is vertically and circumferentially defined by a lower face of the cylinder head 1, an upper face of the piston 4, and a peripheral face of the cylinder 3.

Figure 4:
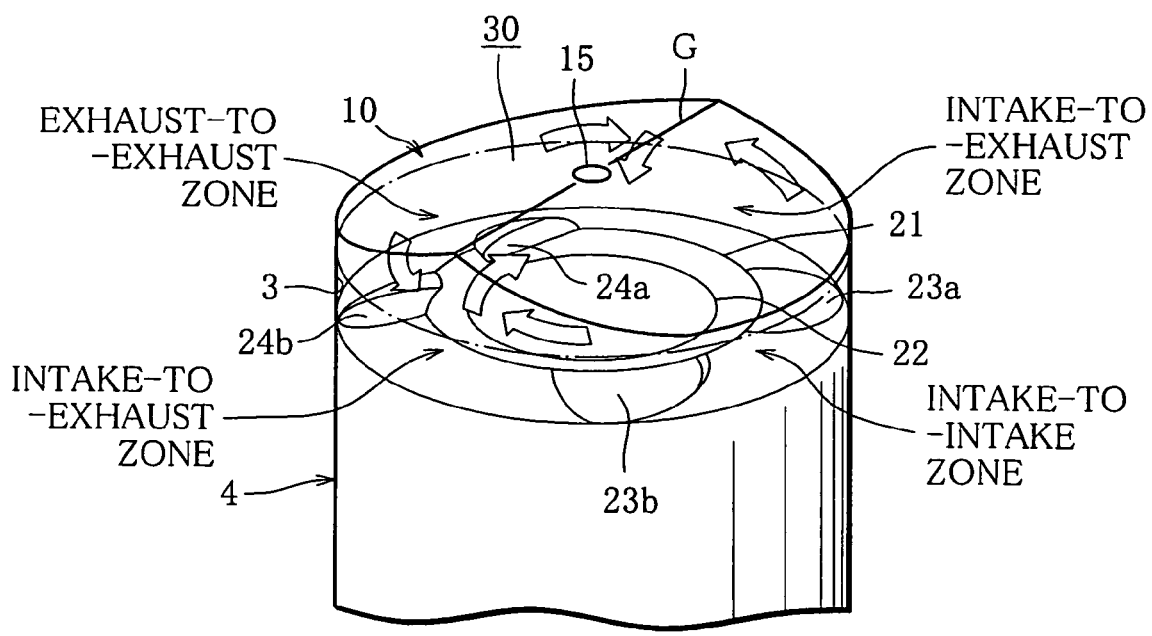
FIG. 4 is a perspective view of the combustion chamber structure according to the first embodiment.

As shown in FIG. 4, the lower face of the cylinder head 1 has a central region thereof located right above the cylinder 3. The central region 10 of the lower face of the cylinder head (hereinafter referred to simply as cylinder head lower face 10) is substantially circular in plan shape and formed into an inverted V shape (pent-roof shape) in vertical cross section. The cylinder head lower face 10 has its top ridge formed by a chord G whose both ends cross a closed curve defining the plan shape of the cylinder head lower face 10 (in this embodiment, the chord G passes through the center of and extends along the diameter of a circle defining the circular plan shape of the cylinder head lower face). The cylinder head lower face 10 has two areas, one located on the intake side and the other located on the exhaust side with respect to the chord G, each formed into a plane and facing each other.

The cylinder head lower face 10 is provided with a pair of intake valves 13a, 13b through which the combustion chamber 30 is connected to or disconnected from intake ports 11, and a pair of exhaust valves 14a, 14 through which the combustion chamber 30 is connected to or disconnected from exhaust ports 12. An ignition plug 15 is disposed at a central portion of the cylinder head lower face 10.

The piston 4 has an upper face thereof formed at its peripheral portion with a tapered portion 21 that conically projects, and at its central portion with a recessed portion 22 that is surrounded by the tapered portion 21. The tapered portion 21 is formed with intake valve recesses 23a, 23b and exhaust valve recesses 24a, 24b by cutting those parts of the tapered portion 21 which respectively correspond to intake valves 13a, 13b and exhaust valves 14a, 14b.

Figure 5:
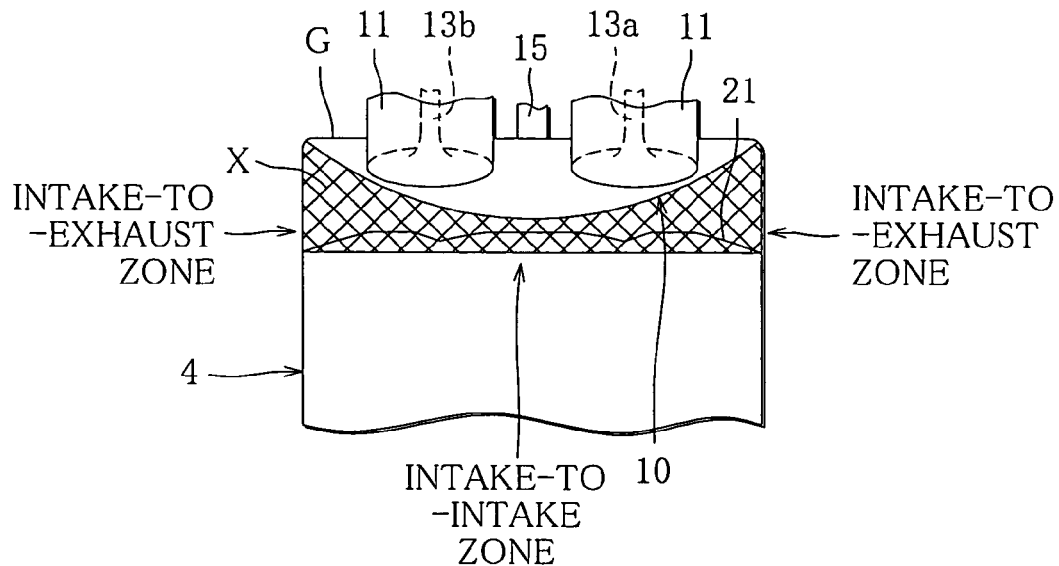
FIG. 5 is a schematic view of a space in the combustion chamber as seen in the direction C of FIG. 1.

Considering a space defined between the tapered portion 21 of the upper face of the piston 4 and a peripheral portion of the cylinder head lower face 10 opposed thereto, i.e., a peripheral portion of the combustion chamber 30, especially, a peripheral face X thereof shown by hatching in FIG. 5, there is a gap between the cylinder head lower face 10 and the upper face of the piston 4. Since the cylinder head lower face 10 forming a flat plane crosses the peripheral face of the cylinder 3 forming a cylindrical plane at the peripheral face X of the combustion chamber 30, the gap between the cylinder head lower face 10 and the upper face of the piston 4 is minimized at the middle of a zone between the intake valves 13a, 13b (hereinafter sometimes referred to as intake-to-intake zone) provided on the intake side in the cylinder head lower face 10. In other words, the gap is formed to be minimized on the vertical bisector of the chord G. The gap gradually and smoothly increases in both directions along the peripheral face of the cylinder 3, and is maximized at the middle of a zone between the intake valve 13a or 13b and the exhaust valve 14a or 14b (hereinafter sometimes referred to as intake-to-exhaust zone). In other words, the gap is configured to be maximized in the vicinity of the chord G.

Although not illustrated in FIG. 5, as in the case of the intake side, there is a gap also on the exhaust side between the cylinder head lower face 10 and the upper face of the piston 4. The gap is configured to be minimized at the middle of a zone between the exhaust valves 14a, 14b (hereinafter sometimes referred to as exhaust-to-exhaust zone) that are provided on the exhaust side of the cylinder head lower face 10, to gradually and smoothly increase in both directions along the periphery of the cylinder 3, and to be maximized in an intake-to-exhaust zone.

In the following, functions of the combustion chamber structure in the internal combustion engine according to this embodiment will be explained.

The gap in the intake-to-exhaust zone is made larger than that in the intake-to-intake zone, and therefore, when the intake valves 13a, 13b are open in the intake stroke so that air-fuel mixture is sucked from the intake ports 11 into the combustion chamber 30, the main intake-air flow can smoothly be introduced into the combustion chamber, whereby a sufficient amount of intake air is ensured. In the subsequent compression stroke, the piston 4 is raised to compress the air-fuel mixture. As mentioned above, at the peripheral portion of the combustion chamber 30, the gap between the cylinder head lower face 10 and the upper face of the piston 4 is small in the intake-to-intake zone and the exhaust-to-exhaust zone, and gradually increases toward the intake-to-exhaust zone. Therefore, in the course of the piston 4 being raised in the compression stroke up to the upper dead center as shown by a one-dotted chain line in FIG. 4, the air-fuel mixture in the peripheral portion of the combustion chamber 30 smoothly flows along the peripheral face of the combustion chamber 30 from the intake-to-intake and exhaust-to-exhaust zones toward the intake-to-exhaust zone, as shown by a white blank arrow in FIG. 4. When the flow of air-fuel mixture from the intake-to-intake zone and the flow from the exhaust-to-exhaust zone collide each other at the middle of the intake-to-exhaust zone (at a position near the chord G), the flows of air-fuel mixture go over the conical tapered portion 21 and vigorously and effectively flow into the central recessed portion 22, whereby the air-fuel mixture in the combustion chamber 30 is mixed satisfactorily.

As explained above, the combustion chamber structure in the internal combustion engine according to this embodiment is capable of controlling the flow of air-fuel mixture with a simplified configuration that comprises the cylinder head lower face 10 formed into a pent-roof shape and the tapered portion 21 and the recessed portion 22 formed in the upper face of the piston 4, instead of using a technique of providing a squish area that requires a strict size tolerance management. This makes it possible to satisfactorily mix the air-fuel mixture in the combustion chamber 30 and to create a sufficient turbulence in the air-fuel mixture. Furthermore, this configuration does not require the provision of shrouds around valves of the cylinder head, making it possible to prevent the intake air amount from being decreased due to the presence of shrouds around the valves. With these functions, the combustion can be promoted to enhance the combustion efficiency, without the need of a costly countermeasure.

In the above, the first embodiment has been explained, which can be modified variously.

For instance, the first embodiment is configured in such a manner that the gap between the cylinder head lower face 10 and the upper face of the piston 4 is small in the intake-to-intake and exhaust-to-exhaust zones and large in the intake-to-exhaust zone. Alternatively, the gap may be made small only in the intake-to-intake zone and large in the intake-to-exhaust zone.

Although both the intake-side area and the exhaust-side area of the cylinder head lower face 10 are formed to be flat in the first embodiment, it is not inevitably necessary to form them into flat so long as the gap between the cylinder head lower face 10 and the upper face of the piston 4 is small in the intake-to-intake and exhaust-to-exhaust zones and large in the intake-to-exhaust zone.

In the first embodiment, a four-valve gasoline engine provided with a pair of intake valves 13a, 13b and a pair of exhaust valves 14a, 14b has been explained. However, this invention is also applicable to a two-valve gasoline engine formed with one intake valve and one exhaust valve.

Although the chord G used in the first embodiment is the one that passes through the center of the circle defining a circular plan shape of the cylinder head lower face, the chord G is not limited thereto, but may be a one not passing through the center of the circle.

Next, a combustion chamber structure in an internal combustion engine according to a second embodiment of this invention will be explained with reference to FIGS. 6–15.

Figure 6:
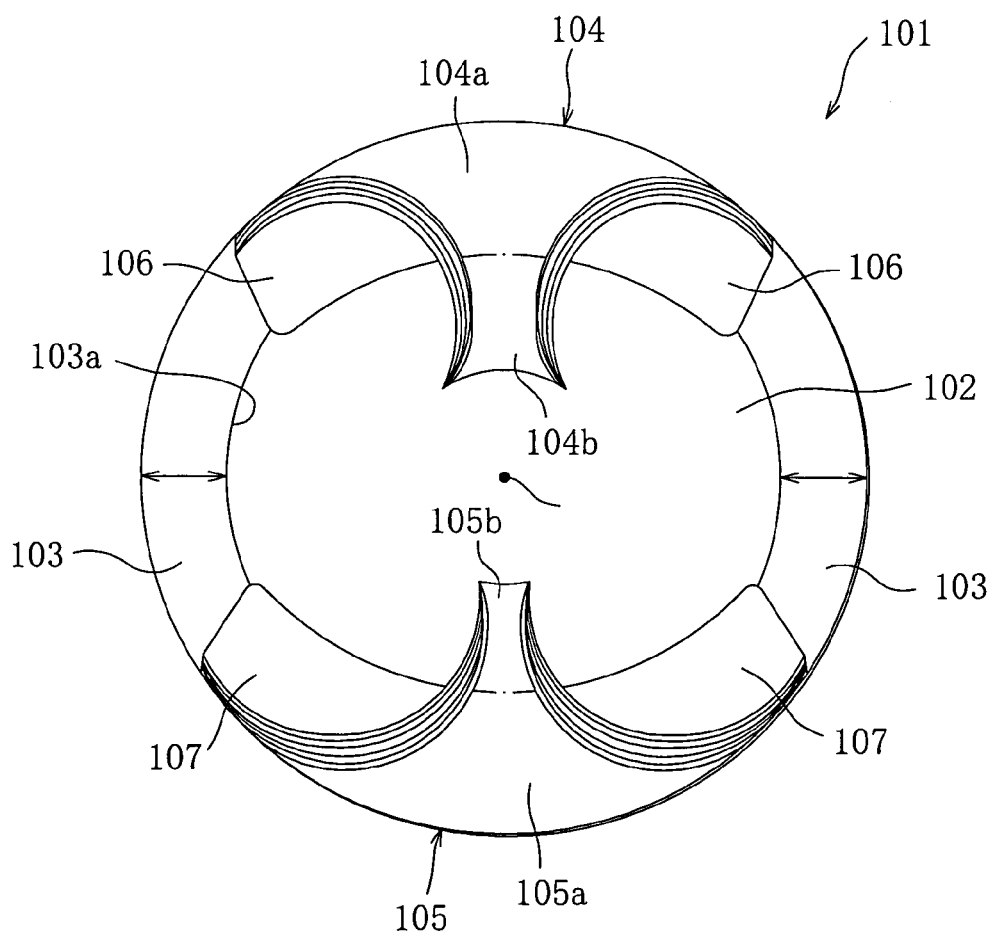
FIG. 6 is a schematic view showing a shape of an upper face of a piston in a combustion chamber structure according to a second embodiment of this invention.

A piston 101 shown in FIG. 6 is adapted to be applied to a four-valve gasoline engine, and has its external form that is cylindrical in shape. The piston 101 is formed at its upper face with a recessed portion 102, a tapered portion 103, a first squish tapered portion 104, a second squish tapered portion 105, an exhaust valve recess 106, and an intake valve recess 107.

Figure 8:
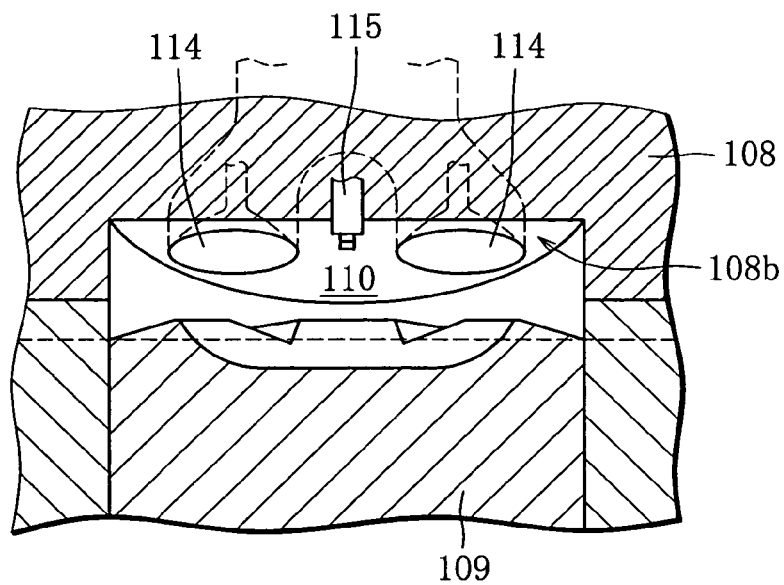
FIG. 8 is a sectional view of the piston taken along the line D—D of FIG. 7.
Figure 9:
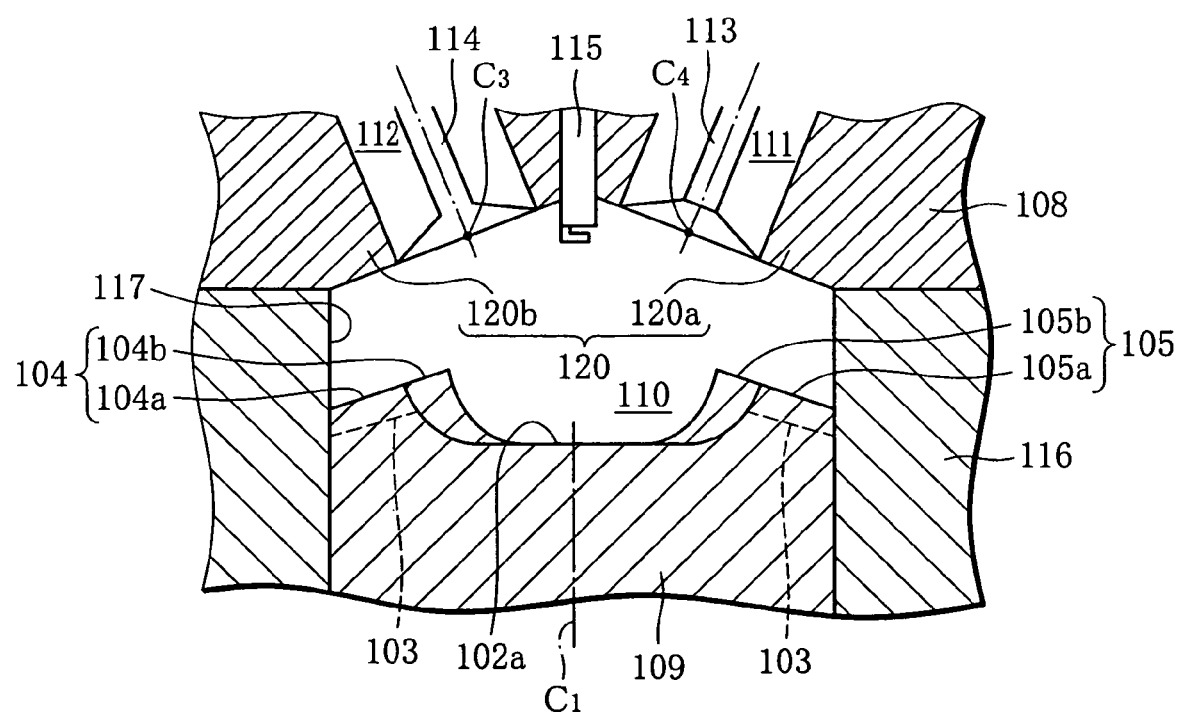
FIG. 9 is a sectional view of the piston taken along the line E—E of FIG. 7.

The engine to which the piston 101 is applied includes a combustion chamber 110 which is vertically defined by a lower face 120 of the cylinder head 108 and an upper face of the piston 101, as shown in FIGS. 8 and 9.

The lower face 120 of the cylinder head 108 is formed into a pent-roof shape and comprised of a first lower face 120a formed to be inclined toward one side 111 and a second lower face 120b toward the other side 112. A spark plug 115 is disposed near the center of the lower face of the cylinder head 108 (i.e., near the center of the combustion chamber 110).

Two intake valves 113 are disposed on the first lower face 120a of the cylinder head 108 forming an upper face of the combustion chamber 110, so that intake ports 118 may be opened or closed, and two exhaust valves 114 are disposed on the second lower face 120b of the cylinder head so that exhaust ports 119 may be opened or closed.

As shown in FIGS. 11–14, the intake valve 113 is a poppet valve consisting of a stem 113a and an end piece 113b, and similarly, the exhaust valve 114 is a poppet valve consisting of a stem 114a and an end piece 114b. The end piece 113b of the intake valve 113 is made larger than that 114b of the exhaust valve 114.

As shown in FIG. 9, a cylinder block on which the cylinder head 108 is placed is formed with a cylindrical cylinder 117 in which the piston 101 is disposed for a sliding motion.

The piston 101 has a tapered portion 103 that is formed to have a predetermined width (shown by symbol $W_1$ in FIG. 6) measured from the periphery of the piston 101. The tapered portion 103 is formed to be gradually raised toward the cylinder head 108 as it gets closer to the piston center $C_1$ (the center of the combustion chamber 110) from the outer periphery of the tapered portion 103.

At a location closer to the piston center $C_1$ with respect to the inner peripheral edge 103a of the tapered portion 103, a recessed portion 102 is formed to be hollowed from the inner peripheral edge 103a of the tapered portion 103 to draw a gentle circular arc, and is formed to have a bottom portion 102a thereof which is substantially horizontal.

As shown in FIG. 6, the upper face of the piston 101 on the side of the exhaust valves 114 is formed with a first squish tapered portion 104 that is constituted by a first tapered body 104a and a first tapered extension 104b. A second squish tapered portion 105 formed on the upper face of the piston 101 on the side of the intake valves 113 is constituted by a second tapered body 105a and a second tapered extension 105b.

The first tapered body 104a of the first squish tapered portion 104 and the second tapered body 105b of the second squish tapered portion 105 are formed to be raised in height toward the cylinder head 108 as they get closer to the piston center $C_1$ from the periphery of the piston 101. As a result, when the piston 101 is lifted up to near the upper dead center, local squish areas are formed between the first tapered body 104a of the first squish tapered portion 104 and the lower face 108a of the cylinder head 108 and between the second tapered body 105a of the second squish tapered portion 105 and the lower face 108b of the cylinder head 108, whereby a squish flow is created in the combustion chamber 110. As to the first extension 104b of the first squish tapered portion 104 and the second extension 105b of the second squish tapered portion 105, explanations will be given later.

The exhaust valve recess 106 is a notch that is formed to avoid the interference between the upper face of the first squish tapered portion 104 and the exhaust valve 114 even when the exhaust valve 114 is open when the piston 101 is lifted up to near the upper dead center. Accordingly, the first squish tapered portion 104 is formed with two exhaust valve recesses 106 at locations respectively corresponding to two exhaust valves 114.

Similarly, the intake valve recess 107 is a notch that is formed to avoid the interference between the upper face of the second squish tapered portion 105 and the intake valve 113 even when the intake valve 113 is open when the piston 101 is lifted up to near the upper dead center. The second squish tapered portion 105 is formed with two intake valve recesses 107 at locations respectively corresponding to two intake valves 113.

Figure 10:
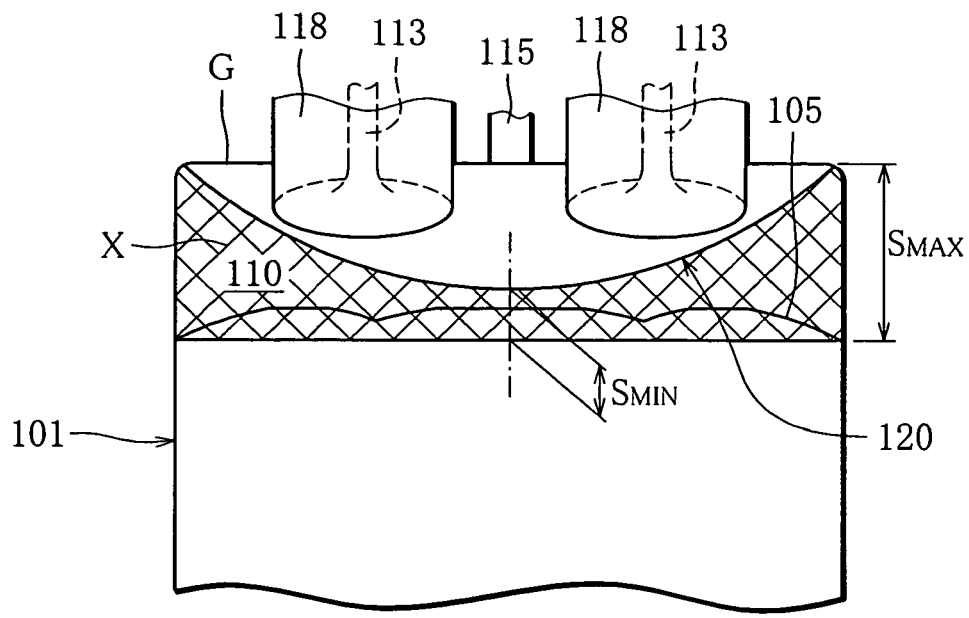
FIG. 10 is a side view of the piston as seen in the direction of an arrow F in FIG. 7.
Figure 11:
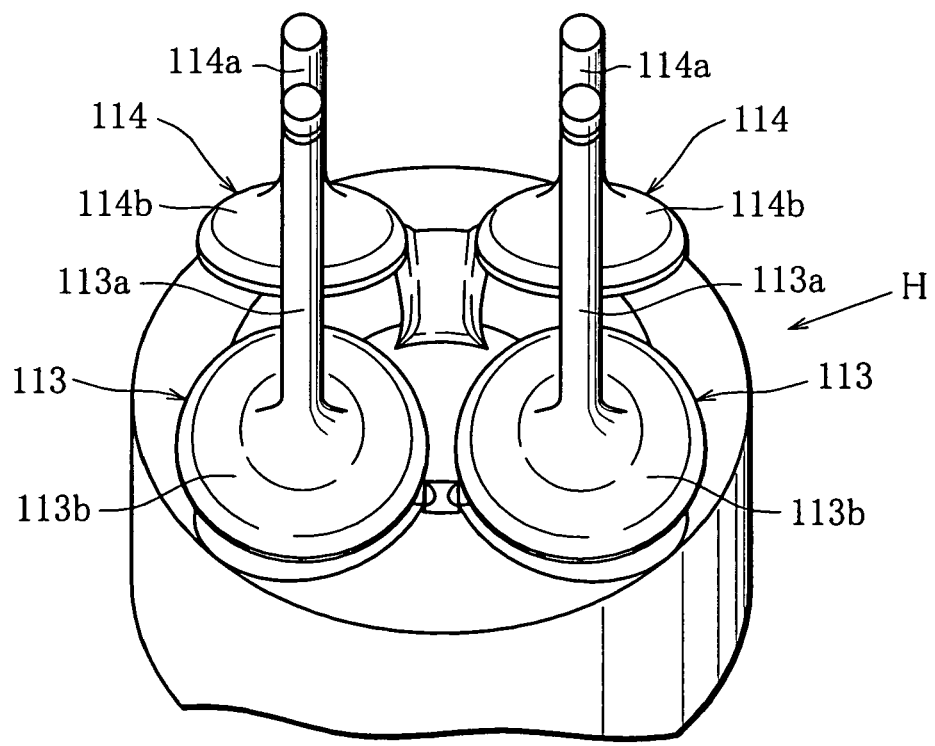
FIG. 11 is a perspective view of the piston as seen from intake valves.
Figure 12:
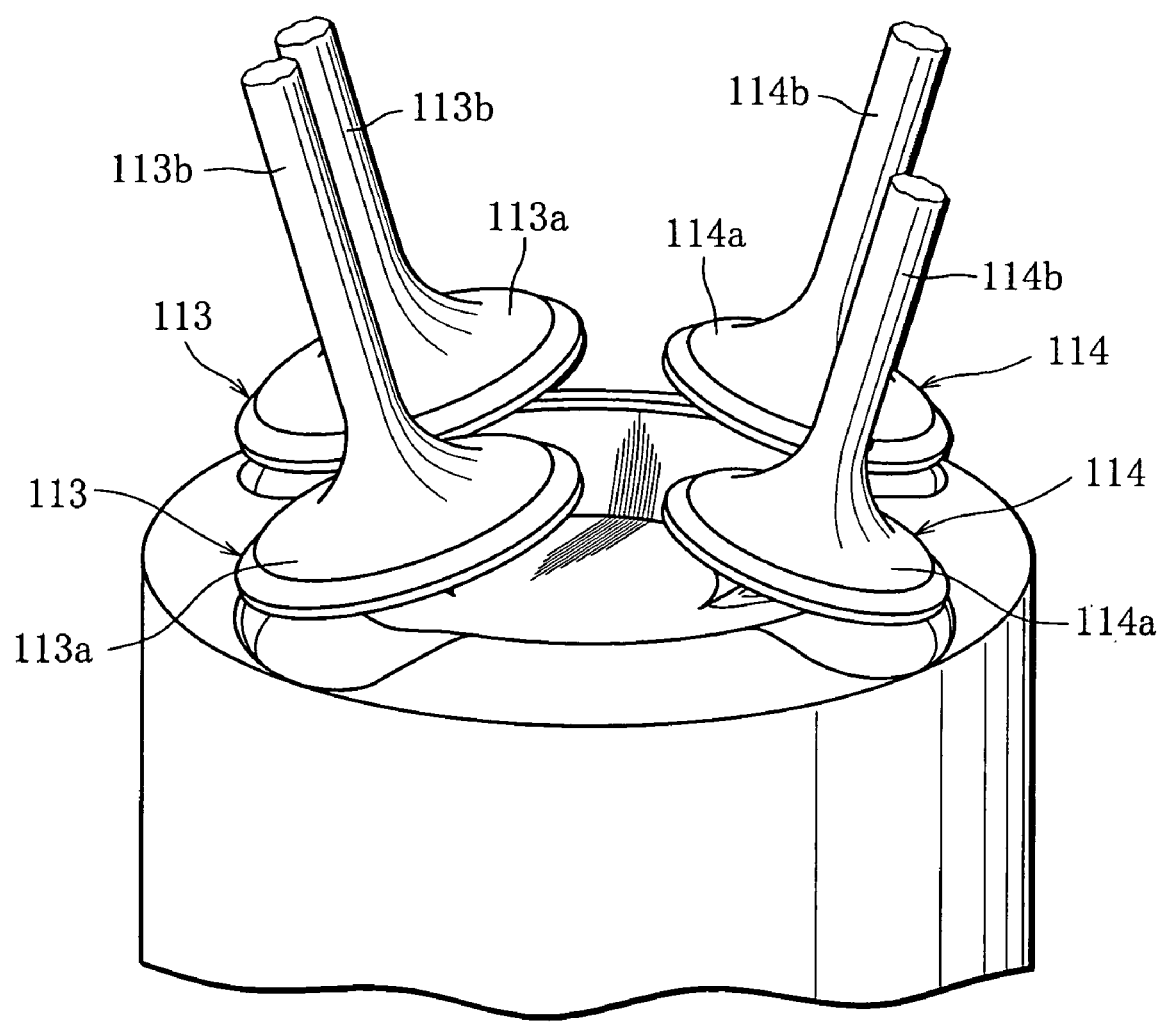
FIG. 12 is a perspective view of the piston as seen in the direction of an arrow H in FIG. 11.

As shown by the hatched part in FIG. 10, on the peripheral face X of the combustion chamber 110, the gap between the upper face of the piston 101 and the opposed lower face 120 of the cylinder head 108 is formed to be minimized in the middle $C_2$ between the two intake valves 113, as shown by symbol $S_{MIN}$ in FIG. 10.

The combustion chamber 110 is formed in such a manner that the gap between the upper face of the piston 101 and the cylinder head lower face 120 gradually increases as it gets away from the middle $C_2$ between the two intake valves 113 in the circumferential direction of the combustion chamber 110, and is maximized (shown by symbol $S_{MAX}$ in FIG. 10) in the vicinity of the top ridge (chord) G of the pent-roof shaped lower fade 120 of the cylinder head 108.

Although an illustration is omitted in FIG. 10, also on the exhaust valve 114 side as on the intake valve 113 side, the combustion chamber 110 is formed in such a manner that the gap between the upper face of the piston 101 and the lower face of the cylinder head 108 is minimized at the middle between the exhaust valves 114, gradually increases as it gets away from the middle between the exhaust valves 114 in the circumferential direction of the combustion chamber 110, and is maximized in the vicinity of the top ridge G of the pent-roof shaped lower face 120 of the cylinder head 108.

The first tapered extension 104b of the first squish tapered portion 104 is formed to extend from between the two exhaust valve recesses 106 toward the piston center $C_1$ up to the recessed portion 102, and the second tapered extension 105b of the second squish tapered portion 105 is also formed to extend from between the two intake valve recesses 107 toward the piston center $C_1$ up to the recessed portion 102.

Figure 7:
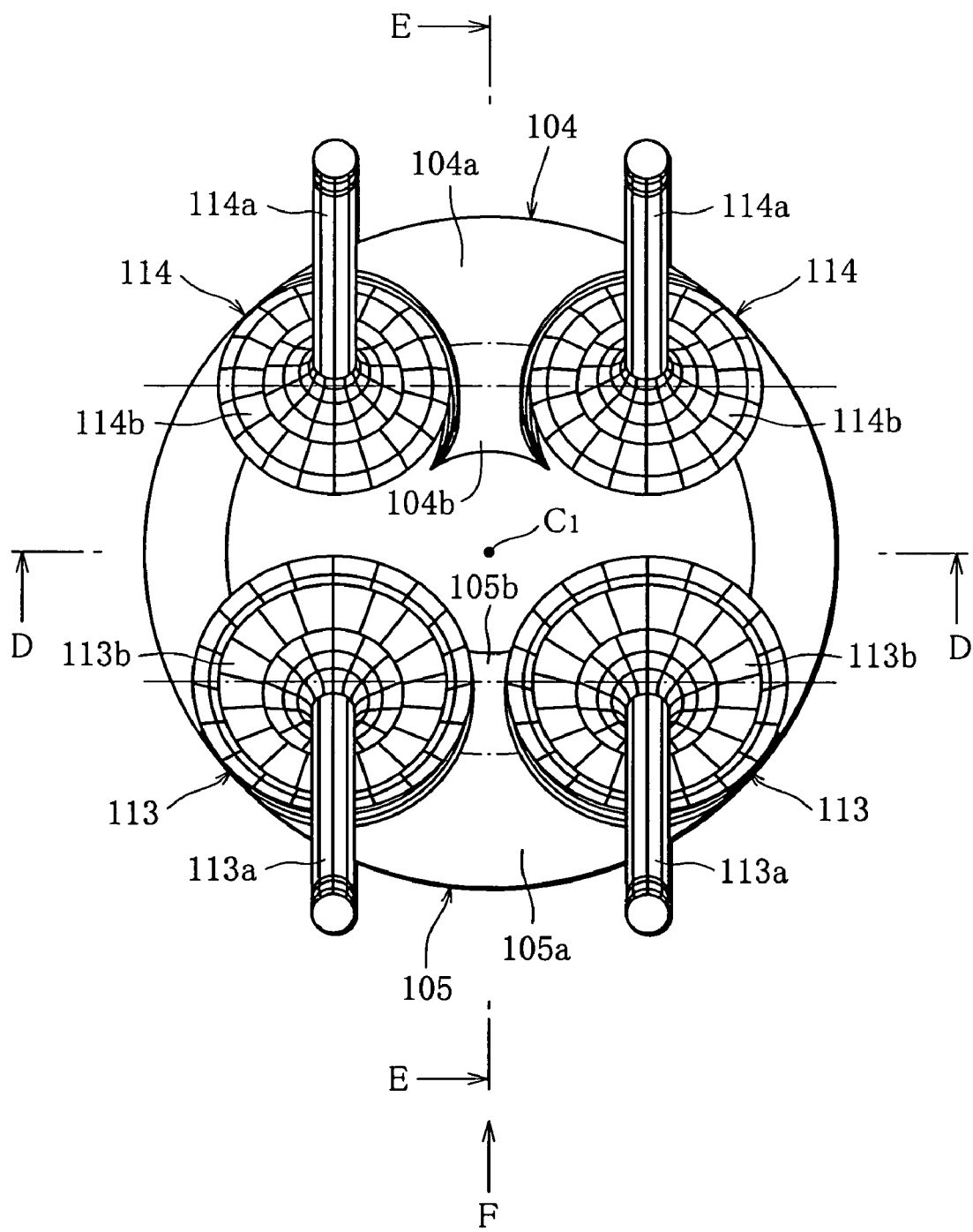
FIG. 7 is a plan view showing the piston of FIG. 6, together with intake and exhaust valves.

Among them, as shown in FIGS. 7 and 9, the first tapered extension 104b is formed in such a manner that the distal end thereof is positioned as viewed in plan at a position closer to the piston center $C_1$ (that is, the lower side in FIG. 7) than to the center position $C_3$ of the exhaust valve 114 which is in a closed state. It is assumed here that the center position $C_3$ of the exhaust valve 114 is a position where the axis (not shown) of the stem 114a of the exhaust valve 114 crosses a lower face of the end piece 114b thereof.

The second tapered extension 105 shown in plan in FIG. 7 is formed in such a manner that the distal end thereof is positioned at a location closer to the piston center $C_1$, than to the center position $C_4$ of the intake valve 113 which is in a closed state. Here, the center position $C_4$ of the intake valve 113 is a position where the axis of the stem 113a of the intake valve 113 crosses a lower face of the end piece 113b.

Figure 13:
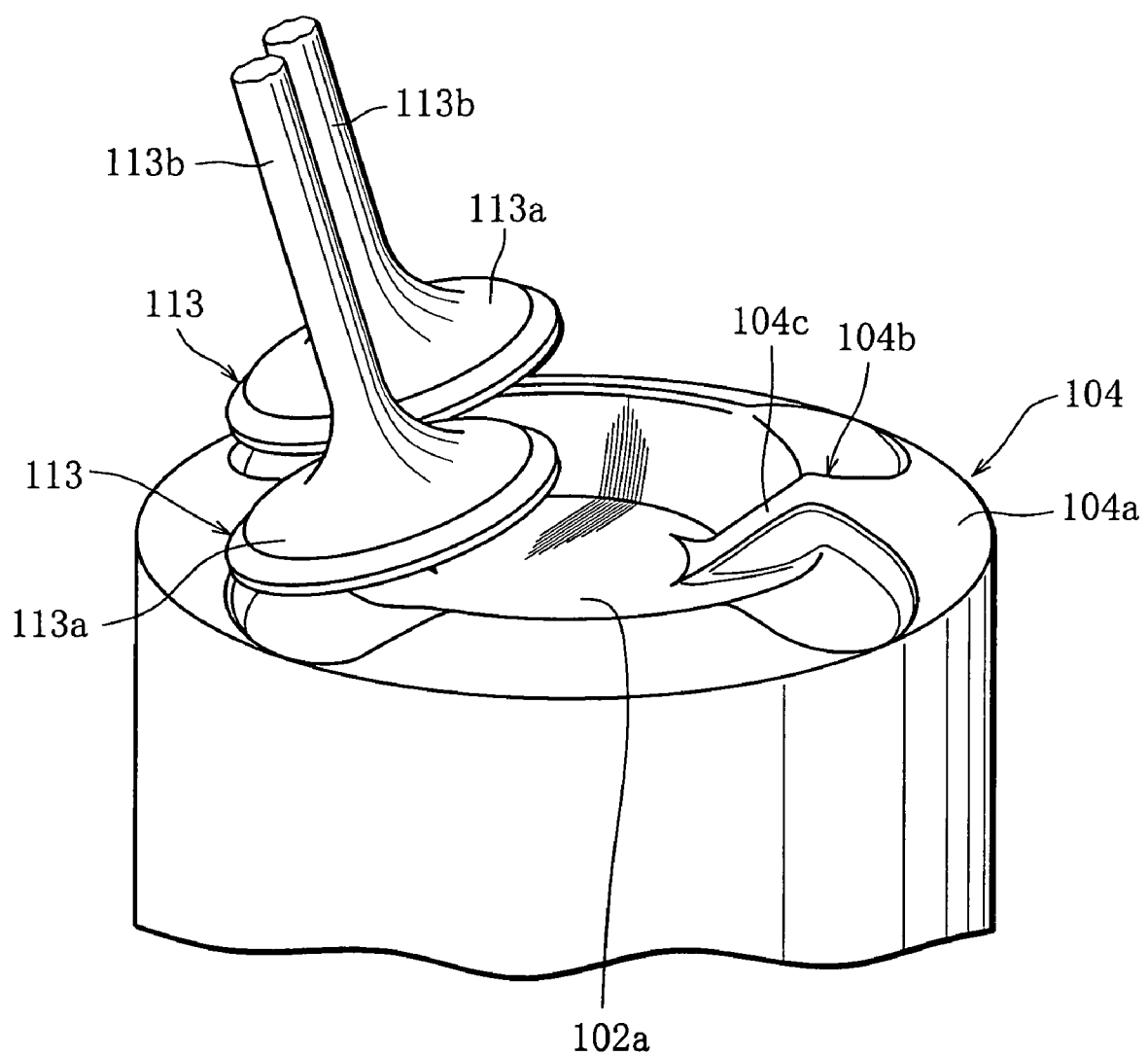
FIG. 13 is a perspective view of the piston, with exhaust valves of FIG. 12 omitted.
Figure 14:
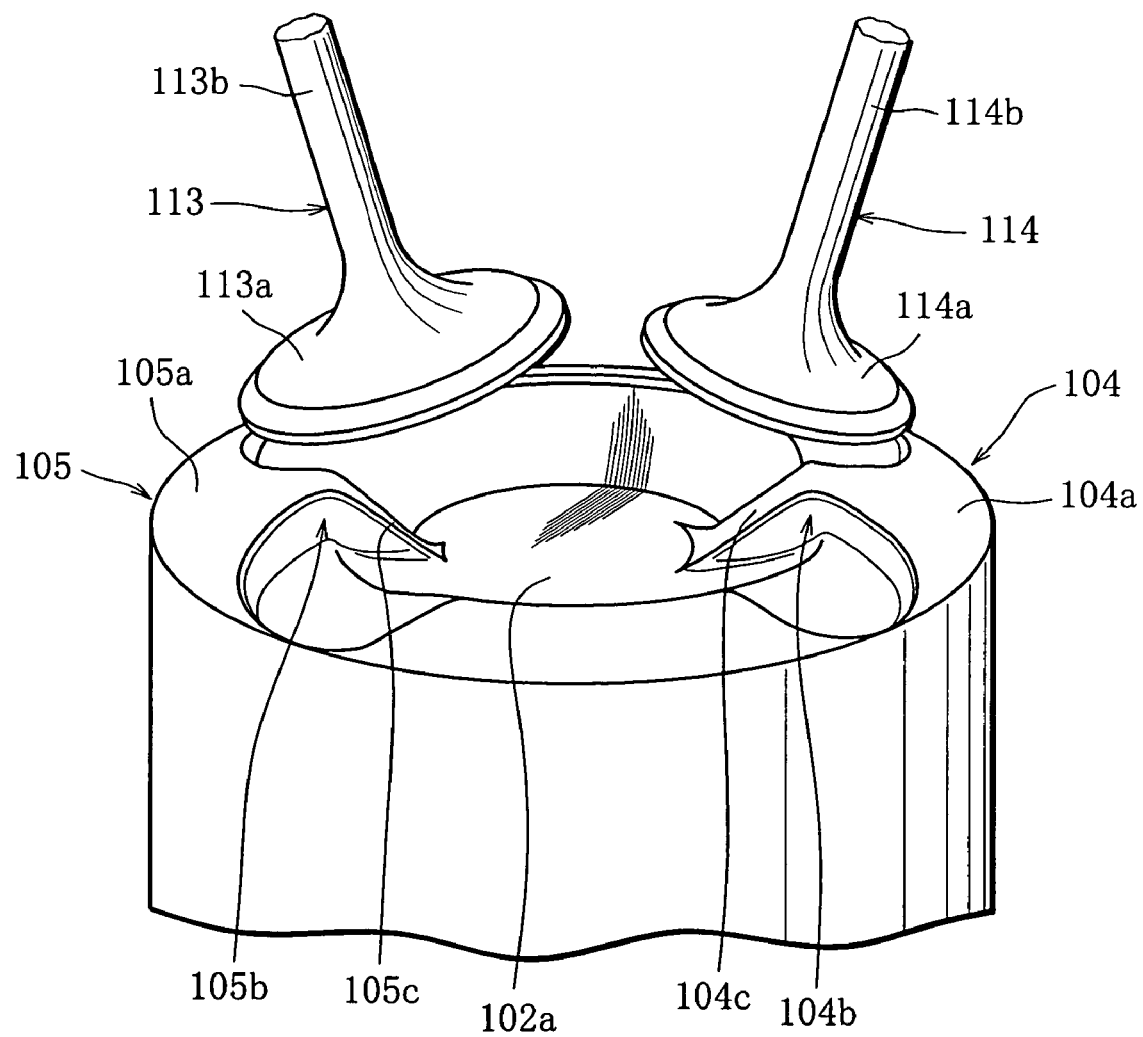
FIG. 14 is a perspective view, similar to FIG. 12, showing the piston together with one of intake valves and one of exhaust valves.

As shown in perspective views of FIGS. 13 and 14, the first tapered extension 104b has a slanted face 104c that is formed to be inclined gently downward from an upper end of the first tapered extension 104b to the bottom portion 102a of the recessed portion 102. Similarly, the second tapered extension 105b is formed to have a slanted face 105c formed to be inclined gently downward from its upper end to the bottom portion 102a of the recessed portion 102.

The combustion chamber structure according to this embodiment that is constructed as explained above achieves functions and advantages which will be mentioned below.

In the intake stroke, the intake valves 113 are opened and an air-fuel mixture is sucked into the combustion chamber 110 from the intake ports 118.

Figure 15:
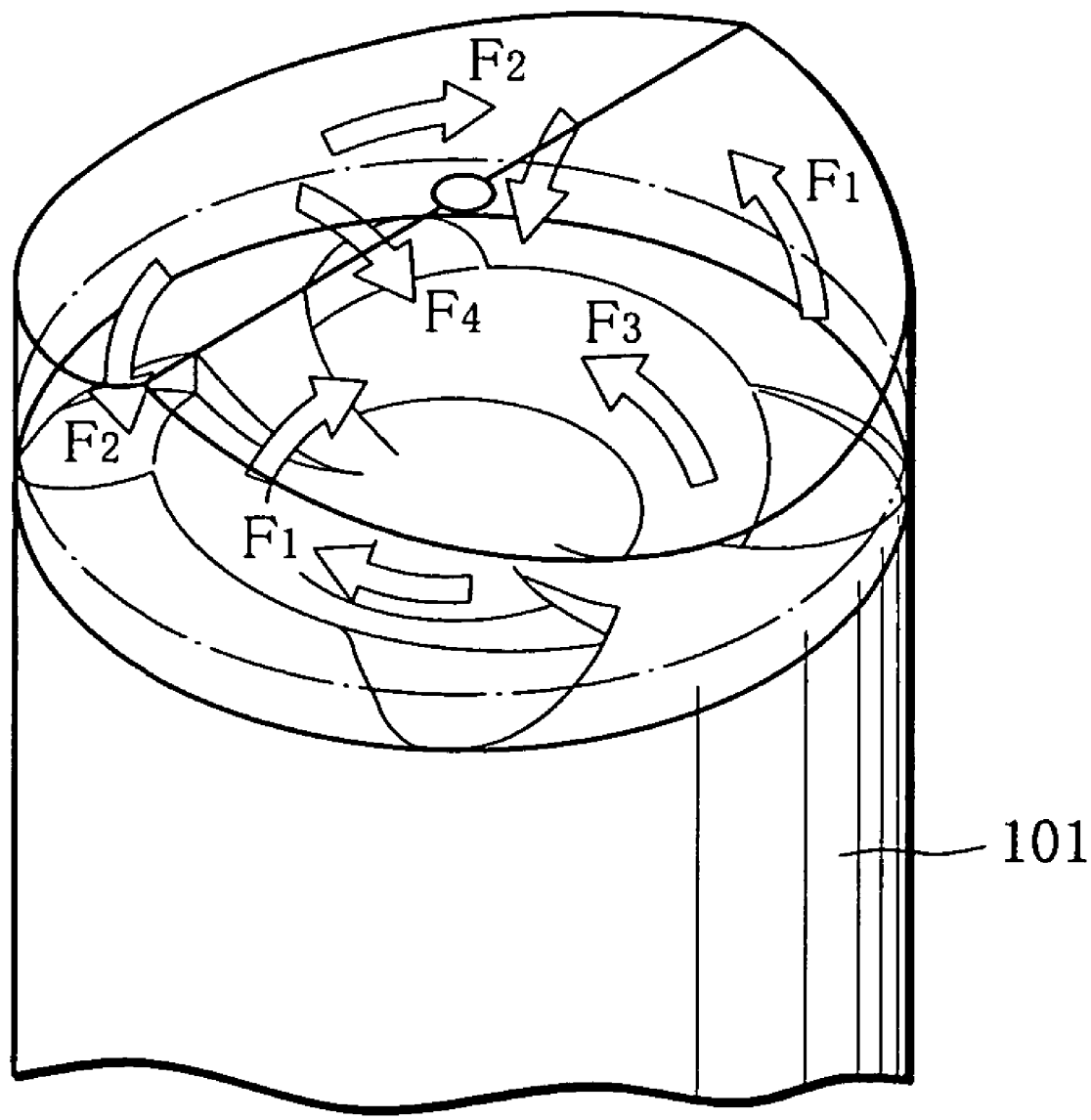
FIG. 15 is a perspective view showing the piston together with squish flows in a combustion chamber.

When the piston 101 is lifted up to the upper dead center in the compression stroke as shown in FIG. 15, the flow of air-fuel mixture (squish flow shown by an arrow $F_1$ in FIG. 15) injected from between the exhaust valves 114 toward the upper end of the combustion chamber 110 (i.e., vicinity of the top ridge G of the pent-roof shape) along the peripheral face of the combustion chamber 110 collides at the center of the combustion chamber 110 with the flow of air-fuel mixture (squish flow shown by an arrow $F_2$ in FIG. 15) flowing from between the intake valves 113 toward the upper end of the combustion chamber 110 along the peripheral face of the combustion chamber 110, whereby the air-fuel mixture in the combustion chamber 110 is satisfactorily mixed.

This is because the lower face 120 of the cylinder head 108 is formed into a pent-roof shape and the upper face of the piston 101 is formed with the first and second squish tapered portions 104, 105, whereby the combustion chamber 110 is formed such that the gap between the lower face 120 of the cylinder head 108 and the upper face of the piston 101 at the peripheral face of the combustion chamber 110 becomes small (refer to symbol $S_{MIN}$ in FIG. 10) at locations between the intake valves 113 and between the exhaust valves 114 and becomes maximum (refer to symbol $S_{MAX}$ in FIG. 10) at the upper end of the combustion chamber 110 (i.e., at the top ridge G of the pent-roof shape), as explained above with reference to FIGS. 9 and 10.

In addition to the squish flows $F_1$ and $F_2$, the piston 101 can produce a squish flow (refer to an arrow $F_3$ in FIG. 15) flowing from between the exhaust valves 114 toward the center $C_1$ of the combustion chamber 110 by way of the first tapered extension 104b and a squish flow (refer to an arrow $F_4$ in FIG. 15) flowing from between the intake valves 113 toward the center $C_1$ of the combustion chamber 110 by way of the second tapered extension 105b. As a result, the mixing of the air-fuel mixture in the combustion chamber 110 is further enhanced.

In particular, since the spark plug 115 is disposed at the center of the combustion chamber 110, when the piston 101 is lifted up to near the upper dead center, the squish flows $F_3$, $F_4$ produced by the first and second tapered extensions 104b, 105b are caused to collide with each other in the vicinity of the spark plug 115, making it possible to ensure the generation of a turbulent flow.

As a consequence, a period of time (i.e., combustion time period) from when the spark plug 115 ignites to when the combustion of air-fuel mixture is completed can be shortened. Thus, even if the compression ratio of the engine is made large, occurrences of knocking can be reliably suppressed.

In a case where much exhaust gas is recirculated (that is, the ratio of EGR gas contained in air-fuel mixture is made large), the combustion time period is generally prolonged, so that there is a tendency that combustion variations occur to lower the combustion efficiency. On the contrary, according to this embodiment where the combustion time period can be shortened, it is possible to suppress combustion variations, thereby greatly increasing the combustion efficiency. This makes it possible to increase the ratio of EGR gas in the air-fuel mixture, contributing to a further improvement of fuel consumption.

As explained above, according to this embodiment, the first tapered extension 104b of the first squish tapered portion 104 an the second tapered extension 105b of the second squish tapered portion 105 can create the squish flows $F_3$, $F_4$ flowing from between the intake valve recesses 107 and between the exhaust valve recesses 108 toward the piston center $C_1$ (i.e., the center of the combustion chamber 110), making it possible to satisfactorily mix the air-fuel mixture in the combustion chamber 110 to thereby improve the combustion efficiency.

Since the tapered extensions 104b, 105b are respectively formed between the intake valve recesses 107 and between the exhaust valve recesses 108, the squish flow $F_4$ created by the tapered extension 105b formed between the intake valve recesses 107 collides at the central part of the combustion chamber 110 with the squish flow $F_3$ created by the tapered extension 104b formed between the exhaust valve recesses 108, whereby these squish flows are mixed with each other to thereby further improve the combustion efficiency.

Moreover, since the distal ends of the tapered extensions 104b, 105b are formed, as viewed in plan, to be closer to the center $C_1$ of the piston 101 than to the center position of the intake valve 113 which is in a closed state, and to be closer to the center $C_1$ of the piston 101 than to the center position $C_3$ of the exhaust valve 114 which is a closed state, it is ensured that the squish flows $F_3$ and $F_4$ reach the central part of the combustion chamber 110, to thereby further improve the combustion efficiency.

Since the spark plug 115 is disposed at the center of the combustion chamber 110, a turbulent flow is created around the spark plug 115 in the squish flows $F_3$, $F_4$ created by the tapered extensions 104b, 105b. This makes it possible to shorten the combustion time period and to increase the combustion efficiency to improve the fuel consumption.

Moreover, since the occurrences of combustion variations can be suppressed by shortening the combustion time period, the ratio of EGR gas in the air-fuel mixture can be increased, contributing to a further improvement of fuel consumption.

The foregoing second embodiment may be modified variously. For instance, in the second embodiment, a case where there are provided two intake valves 113 and two exhaust valves 114 has been explained by way of example.

The present invention is also applicable to an engine comprising three or more intake valves and three or more exhaust valves. In this case, tapered extensions may be formed between intake valve recesses and/or between exhaust valve recesses, which are provided to correspond in number to the intake and/or exhaust valves.

In other respects, this invention is not limited to the first and second embodiments, and may be embodied with various modifications effected within the scope of this invention.

What is claimed is:

1. A combustion chamber structure in an internal combustion engine having a combustion chamber that is vertically defined by a lower face of a cylinder head and an upper face of a piston fitted in a cylinder, the lower face of the cylinder head being substantially circular in plain shape, comprising:
    at least one intake valve provided on one side of the cylinder head with respect to a predetermined chord having both ends thereof crossing a curve that defines the plain shape of the lower face of the cylinder head;
    at least one exhaust valve provided on another side of the cylinder head with respect to the predetermined chord;
    a tapered portion formed substantially conical in shape at a peripheral portion of the upper face of the piston; and
    a recessed portion formed at near a center of the upper face of the piston,
    wherein a gap between said tapered portion and a peripheral portion of the lower face of the cylinder head opposed thereto is formed to increase toward vicinity of said chord.

2. The combustion chamber structure according to claim 1, wherein said gap is formed to be larger at a location near said chord than at a location near a vertical bisector of said chord at least on the one side of the cylinder head.

3. The combustion chamber structure according to claim 1, wherein the cylinder head is formed with a pair of intake valves on the one side thereof and with a pair of exhaust valves on another side thereof with respect to said chord, and
    said gap is formed to be larger at a location near the chord than at a location near a vertical bisector between the pair of intake valves.

4. The combustion chamber structure according to claim 2 or 3, wherein said gap is formed to be minimized on the vertical bisector and gradually increase toward said chord along a peripheral face of the cylinder.

5. The combustion chamber structure according to claim 1, further comprising:
    two intake valve recesses formed in said tapered portion so as to correspond to a pair of intake valves;
    two exhaust valve recesses formed in said tapered portion so as to correspond to a pair of exhaust valves; and
    an extension formed by extending that part of said tapered portion which is located between said two intake valve recesses or said two exhaust valve recesses, toward the center of the piston up to said recessed portion.

6. The combustion chamber structure according to claim 5, wherein said extension has a slanted face which is inclined from an upper end of the extension to a bottom portion of the recessed portion.

7. The combustion chamber structure according to claim 5 or 6, wherein said extension is formed in the part of said tapered portion which is located between the two intake valve recesses or between the two exhaust valve recesses.

8. The combustion chamber structure according to claim 7, wherein said extension is formed between the two intake valve recesses and between the exhaust valve recesses, and each extension has a distal end thereof located closer to the center of the piston than to the middle between the pair of intake valves or between the pair of exhaust valves.

* * * * *